United States Patent
Saunders

(10) Patent No.: US 7,025,088 B2
(45) Date of Patent: Apr. 11, 2006

(54) PROVIDING AN INDICATION OF THE POSITION OF A VALVE MEMBER

(75) Inventor: Arthur Frank Saunders, Bridgwater (GB)

(73) Assignee: Honeywell Normalair-Garrett (Holdings) Limited, Yeovil (*) Notice: Subject to any disclaimer, the term of this patent is extended or adjusted under 35 U.S.C. 154(b) by 365 days.

(21) Appl. No.: 10/695,161

(22) Filed: Oct. 28, 2003

(65) Prior Publication Data
US 2004/0129316 A1 Jul. 8, 2004

(30) Foreign Application Priority Data
Oct. 29, 2002 (GB) .................................. 0225118

(51) Int. Cl.
*F16K 37/00* (2006.01)

(52) U.S. Cl. .................. 137/552; 137/488; 137/553; 137/557; 244/118.5; 244/134 R; 340/611

(58) Field of Classification Search .............. 137/488, 137/552, 553, 557; 340/606, 608, 611
See application file for complete search history.

(56) References Cited

U.S. PATENT DOCUMENTS

| | | | |
|---|---|---|---|
| 2,773,251 A | | 12/1956 | Snyder |
| 3,393,699 A | * | 7/1968 | Feldman ............... 137/489 |
| 3,682,196 A | * | 8/1972 | Kosui et al. ............ 137/553 |
| 3,909,152 A | * | 9/1975 | Rannenberg ............ 415/27 |
| 4,188,624 A | * | 2/1980 | Hochsprung et al. ..... 340/606 |
| 4,428,194 A | * | 1/1984 | Stokes et al. ............ 60/779 |
| 6,308,723 B1 | * | 10/2001 | Louis et al. ............... 137/1 |
| 6,446,657 B1 | * | 9/2002 | Dziorny et al. .......... 137/219 |
| 6,557,400 B1 | * | 5/2003 | Xiong et al. ........... 73/118.1 |
| 6,631,716 B1 | | 10/2003 | Robinson et al. |

* cited by examiner

*Primary Examiner*—Ramesh Krishnamurthy
(74) *Attorney, Agent, or Firm*—MacMillan, Sobanski & Todd, LLC

(57) ABSTRACT

A method of providing an indication of the position of a valve member of a valve in a fluid path where the valve member is moveable between a fully open position in which a maximum flow of fluid past the valve member is permitted and a closed position in which fluid flow past the valve member is at least substantially prevented, the method including sensing the fluid pressure in the fluid path upstream of the valve member to provide a first signal to a controller, sensing fluid pressure in the fluid path downstream of the valve member to provide a second signal to the controller, and sensing fluid flow downstream of the valve member to provide a third signal to the controller, the controller comparing the first and second signals and applying the third signal, and depending on the comparison of the first and second signals and the third signal, the controller signalling an alerting device which indicates whether the valve member is in at least one of an open and closed position.

21 Claims, 2 Drawing Sheets

PROVIDING AN INDICATION OF THE POSITION OF A VALVE MEMBER

BACKGROUND OF THE INVENTION

This invention relates to a method of and apparatus for providing an indication of the position of a valve member in a fluid path.

Rotary and linear moveable valve members are well known for controlling the pressure and flow of fluid, such as air, in fluid systems.

In one exemplary application of the present invention, in an aircraft, pressurised air may be bled from one or more aircraft engine, for use in an air-conditioning system or an anti-icing system, for examples only. The air flow from the engine or engines is controlled by a valve which has a moveable valve member, such as a rotary butterfly valve member or a linearly acting valve member, which valve is power operated under the control of a controller, which may be a dedicated valve controller, or part of a more general control system.

In an aircraft, there is an airworthiness requirement that an indication may be given e.g. to a pilot, as to whether the valve member is closed or open. Conventionally this is established by the provision of one or more micro-switches read switches or proximity switches, located such that the switch is or switches are operated as the valve member moves to a fully open and/or fully closed position, but such switches require a switchable source of electrical power to operate.

From the point of view of switch sensitivity, an ideal position to locate such switches is close to an operating arm which is carried by and hence located close to the valve member. Such a prior art arrangement is indicated in the drawing and is described briefly below with reference to the drawing.

Particularly in use in a fluid path for hot engine bleed air in an aircraft, in this position, the switch(es) is/are subjected to substantial heat, possibly up to or in excess of 500° C., at which temperature, the performance of the switch can adversely be affected. Also, whereas butterfly/linearly acting valves may be designed to be sufficiently robust to withstand repeated valve member movement and at high speed in such harsh environment, switches are less tolerant. Switches are also not inexpensive to provide and maintain.

DESCRIPTION OF THE PRIOR ART

It is known to determine air flow across a valve by measuring fluid pressure upstream and downstream of the valve and measuring fluid flow rate downstream of the valve, and to use such measurements to control the position of the valve member using a suitable actuator system, to control fluid pressure and flow to meet demand.

SUMMARY OF THE INVENTION

According to a first aspect of the invention we provide a method of providing an indication of the position of a valve member of a valve in a fluid path where the valve member is moveable between a fully open position in which a maximum flow of fluid past the valve member is permitted and a closed position in which fluid flow past the valve member is at least substantially prevented, the method including sensing the fluid pressure in the fluid path upstream of the valve member to provide a first signal to a controller, sensing fluid pressure in the fluid path downstream of the valve member to provide a second signal to the controller, and sensing fluid flow downstream of the valve member to provide a third signal to the controller, the controller comparing the first and second signals and applying the third signal, and depending on the comparison of the first and second signals and the third signal, the controller providing signalling an alerting device which indicates whether the valve member is in at least one of an open and the closed position.

Thus using a first pressure sensor upstream of the valve member which may already be provided for flow control purposes, a second pressure sensor downstream of the valve-member which may already be provided for flow control purposes, and a fluid flow sensor which may already be provided for flow control purposes, an indication of the position of the valve member may be given by the alerting device, which may for example be a visual display and/or audible warning device.

The method may include determining whether the fluid pressure upstream of the valve member is significantly higher than the fluid pressure downstream of the valve member, and if so, if sensed fluid flow is at least below a threshold value, the controller may signal the alerting device to indicate that the valve member is in its closed position.

In one embodiment, the valve is a butterfly valve, the valve member being rotatable in the fluid path and in its closed position, a periphery of the valve member and an internal surface of a fluid duct in which the fluid flow path is established, engaging to prevent fluid flow past the valve member. However, the invention may be applied to other kinds of valve, including valves which have valve members which are linearly moveable between their fully open and closed positions.

In each case, the valve member may be moveable between its fully open and closed positions by an actuating system under the control of a valve controller, which may be the same as the controller which processes the first, second and third signals, to provide the input to the alerting device, or a separate controller. The actuating system may include an electrically or fluid operated, actuator, which is connected to the valve member via a transmission. The actuator may be a linearly acting actuator, and where the valve member is of the rotatable kind, the linear action of the linear actuator may be converted to a rotation of the valve member by the transmission.

Where the actuator is electrically operated, this may be for example a stepper or other motor, and where the valve member is linearly moveable, the rotation action of the motor may be converted to a linear valve member movement by the transmission.

The pressure and flow sensors may be of any desired kind, for examples only, venturi or hot wire sensors, but in each case the sensors are preferably transducers which provide electrical signals to the controller.

The invention has been particularly but not exclusively developed for use in a fluid flow path along which hot pressurised air bled from a gas turbine engine passes to a downstream auxiliary system, such as an air conditioning or anti-icing system, for examples in an aircraft, in which case the alerting device for indicating the position of the valve member may be located in or adjacent an aircraft cockpit, in each case to alert the aircraft pilot or other member of the air crew when the valve member is in at least one of its fully open and closed positions.

According to a second aspect of the invention we provide an apparatus for providing an indication of the position of a valve member in a fluid path where the valve member is moveable between a fully open position in which a maximum flow of fluid past the valve member is permitted and a closed position in which fluid flow past the valve member is at least substantially prevented, the apparatus including a first sensor for sensing the fluid pressure in the fluid path upstream of the valve member to provide a first signal, a second sensor for sensing fluid pressure in the fluid path downstream of the valve member to provide a second signal and a third sensor for sensing fluid flow downstream of the valve member to provide a third signal, a controller for comparing the first and second signals and applying the third signal, the controller being configured so that, depending on the comparison of the first and second signals and the third signal, the controller signalling an alerting device which indicates whether the valve member is in at least one of an open and closed position.

The apparatus of the second aspect of the invention may have any of the features of the apparatus referred to according to the first aspect of the invention.

According to a third aspect of the invention we provide an aircraft having a fluid flow path for pressurised air from an aircraft engine to a downstream auxiliary system, the aircraft including an apparatus according to the second aspect of the invention.

BRIEF DESCRIPTION OF THE DRAWINGS

Examples of the invention will now be described with reference to the accompanying drawings in which.

DETAILED DESCRIPTION OF THE INVENTION

Figure 1:
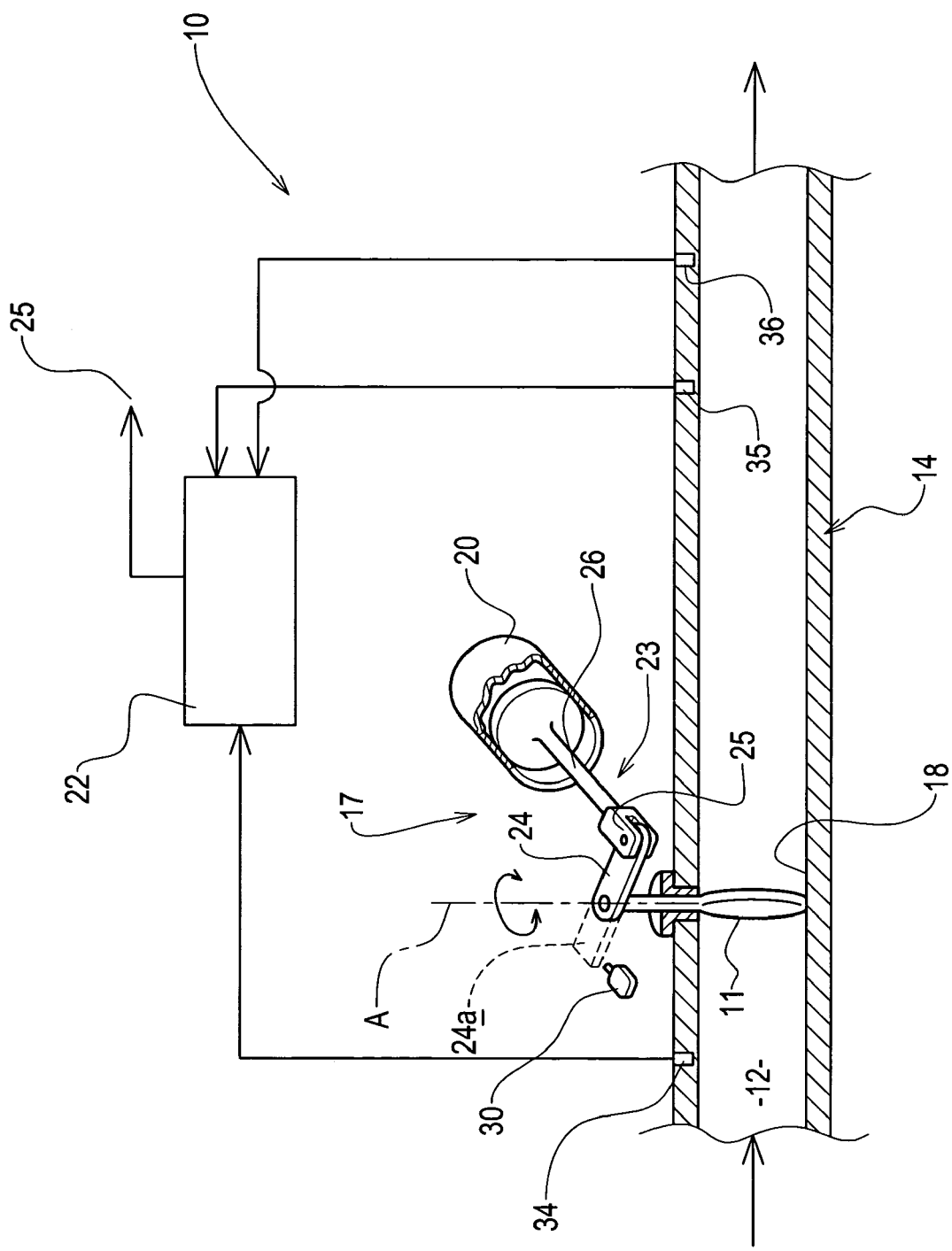
FIG. 1 is an illustrative view of an apparatus by which the method present invention may be performed, and indicating a prior art proposal.

Referring to the drawings there is shown an apparatus 10 for providing an indication of the position of a valve member 11 in a fluid path 12. In this example, the fluid flow path 12 is from an upstream air bleed for pressurised air from an aircraft gas turbine engine C, to an air conditioning system in which the air is conditioned for use, for example as a breathable air supply in an aircraft B, or an de-icing system. The fluid flow path 12 includes a duct 14, which in this example is round in cross section, at least in the vicinity of the valve member 11 which is provided to control the fluid flow along the duct 14 as follows.

The valve member 11 in this example is a rotatable member, rotatable about the axis indicated at A, by an actuating system 17, between a fully open position in which a maximum fluid flow past the valve member 11 is permitted, and a closed position in which a periphery of the (circular) valve member 11 engages with an internal surface 18 of the (round) duct 14, so that fluid flow past the valve member 11 is at least substantially, and preferably altogether prevented.

The valve member 11 position thus controls fluid flow through the duct 14, for example to match the fluid supply with downstream system demand, as required.

In this example, the valve actuating system 17 includes a fluid operated linear actuator 20, the operation of which is controlled by a system controller 22, but in another example, an electrically operated linear actuator, or a rotatable action electrically or fluid powered actuator may instead be used. In each case, the actuator 20 action is transmitted to effect valve member 11 movement, via a transmission which is indicated generally in the drawing at 23.

In the example shown, the transmission 23 includes a lever 24 which is pivotally coupled at 25 to a piston rod 26 of the linear actuator 20, the lever 24 carrying a drive shaft 28 which is coupled to the valve member 11 and rotates about the axis A to rotate the valve member 11.

Thus the linear action of the actuator 20 is converted to a rotation of the valve member 11, but in another example where the valve member 11 is linearly moveable between its fully open and closed positions, the transmission 23 may convert a rotational action of the actuator 20 to a linear valve member 11 movement as required.

Conventionally to determine if the valve member 11 is in an open or closed position, one or more micro-switches were provided. In the drawing, the position in which such a micro-switch might be provided is indicated at 30. In such a prior proposal, the lever 24 of the transmission 23 would typically be extended as indicated in dotted lines at 24a, so that as the valve member 15 rotates to its closed position, the extended lever 24a would engage the micro-switch 30 which would close (or open) an electrical circuit to cause an alerting device such as a visual and/or audible indicator, to indicate that the valve member 11 is in its closed position.

In accordance with the invention, there is provided a first pressure sensor 34 located so as to sense the fluid pressure in the duct 14 upstream of the valve member 11. As indicated, conveniently the sensor 34 is provided in a drilling in the duct 14 wall. The first pressure sensor 34 is a transducer which in this example provides a first electrical signal to the controller 22, which may be the same or a different controller to that which controls the valve member 11 position. The first signal is indicative of the fluid pressure in the duct 14 upstream of the valve member 11.

A second pressure sensor 35 is provided in a drilling in the duct 14 wall downstream of the valve member 11 to sense fluid pressure in the duct 14 downstream of the valve member 11. The second pressure sensor again is a transducer which provides a second electrical signal to controller 22, indicative of fluid pressure in the duct 14 downstream of the valve member 11.

The apparatus 10 further includes an fluid flow sensor 36 which again is a transducer which provides a third electrical signal to the controller 22 indicative of fluid flow in the duct 14.

The controller 22 is configured to compare the first and second signals to determine whether the fluid pressure upstream of the valve member 11 is significantly greater than or generally the same as the fluid pressure downstream of the valve member 11. In the event that the fluid pressure upstream of the valve member 11 is determined to be substantially greater than the fluid pressure downstream of the valve member 11, this could be as a result of the valve member 11 being in its closed position. If the third electrical signal indicates a fluid flow below a threshold value, this would confirm that the valve member 11 is in its closed position. As a result the controller 22 is configured in this example to signal an alerting device 25 by providing an input to the alerting device 25, to indicate to a pilot or other air crew member that the valve member 11 is in its closed position.

The alerting device 25 may be a simple visual display, and/or an audible warning device located close to a pilot P of the aircraft or other crew member.

Because some leakage of fluid past the valve member 11 may be possible even with the valve member 11 in its closed position, the flow sensor 36 is set to sense a minimum threshold fluid flow rather than a zero value.

So that the system 10 only indicates when the valve member 11 is as fully closed as possible, preferably the controller 22 is configured on comparing the first and second electrical signals, to provide the input to the alerting device 25, only when the difference sensed between the upstream and downstream pressures is significant, by which we mean greater than a threshold difference. Also, to prevent the apparatus 10 giving a false indication that the valve member 11 is in its closed position when there is little or no fluid flow along the duct (e.g. if the aircraft engine from which the fluid is provided is throttled back), the controller 22 may be configured only to compare the first and second signals when the pressure sensed by the first sensor 34 upstream of the valve member 11 is above a predetermined value.

Various modifications may be made without departing from the scope of the invention. For example the pressure sensors 34, 35 need not provide electrical signals to the controller 22 but may provide fluid signals indicative of fluid pressure sensed in the duct 14 at the respective locations. The pressure, sensors 34, 35 and the fluid flow sensor 36 may be of the hot wire or venturi kind or another kind as desired.

In another example, the controller 22 provides an input to the alerting device or otherwise signal the alerting device to indicate that the valve member 11 is not in its closed position, but is in an open position or even its fully open position. Further alternatively, the alerting device may indicate that the valve member 11 is in its closed position by providing a first alert, and in an open position by providing an alternative alert as appropriately signalled to do so by the controller 22. In these cases, the controller 22 would need to be configured to provide appropriate inputs to the alerting device, but the respective input or inputs may be derived from the controller 22 using the same logic as is required to determine whether the valve member 11 is in the closed position as described above.

Although the examples described relates to a valve in an air flow path for pressurised bleed air, the invention may be applied to other valves in other fluid flow paths, as desired, such as for one example only, an air flow path of an auxiliary power unit of an aircraft.

Figure 2:
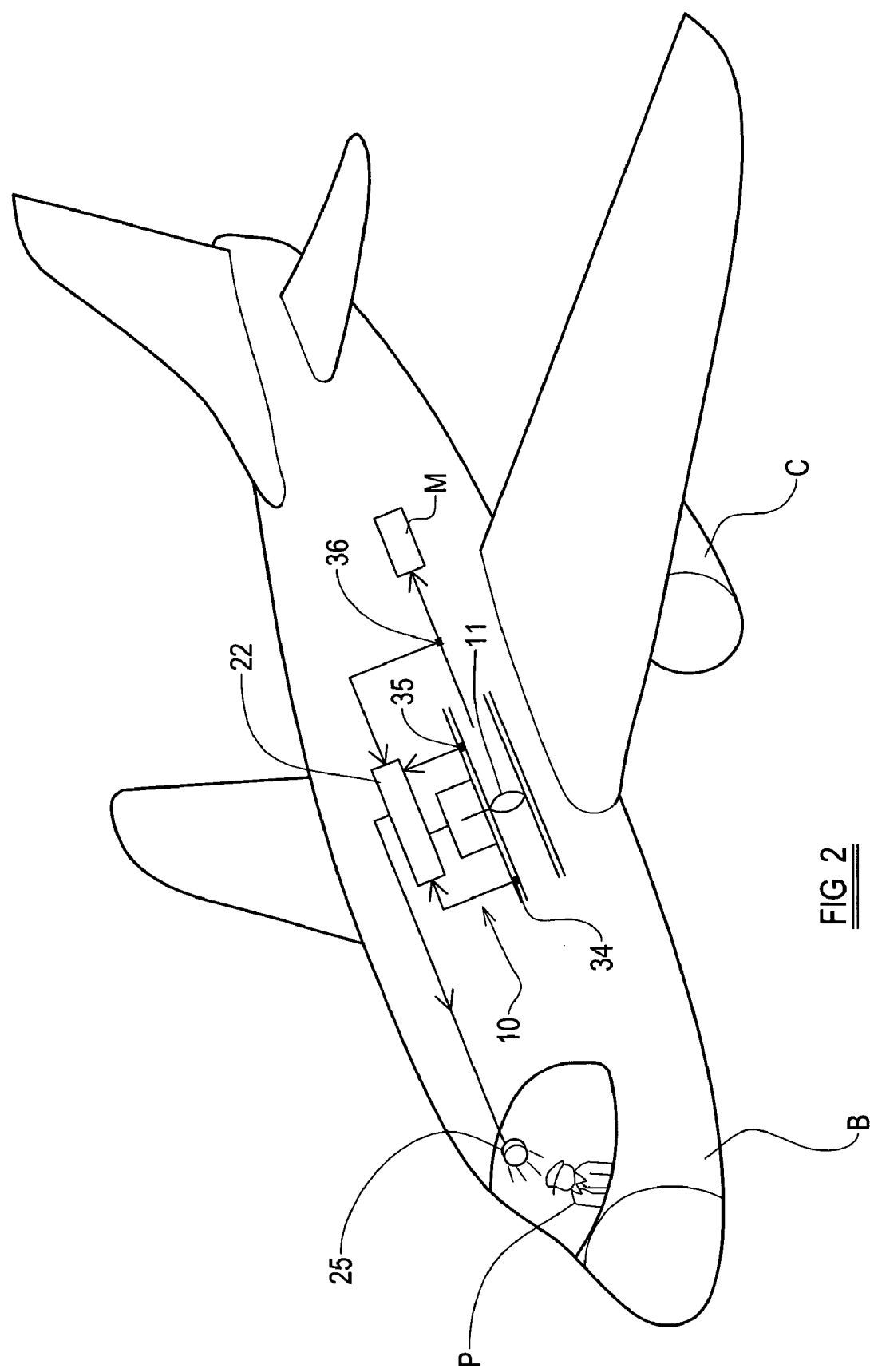
FIG. 2 shows an aircraft including the apparatus of FIG. 1.

In FIG. 2, there is shown an aircraft B with a gas turbine engine C from which compressed air may be bled for use in the apparatus 10 described.

The apparatus 10 may be provided in other aircraft types if desired.

The invention claimed is:

1. A method of providing an indication of the position of a valve member of a valve in a fluid path where the valve member is moveable between a fully open position in which a maximum flow of fluid past the valve member is permitted and a closed position in which fluid flow past the valve member is at least substantially prevented, the method including sensing the fluid pressure in the fluid path upstream of the valve member to provide a first signal to a controller, sensing fluid pressure in the fluid path downstream of the valve member to provide a second signal to the controller, and sensing fluid flow downstream of the valve member to provide a third signal to the controller, the controller comparing the first and second signals and applying the third signal, and depending on the comparison of the first and second signals and the third signal, the controller signalling an alerting device which indicates whether the valve member is in at least one of an open and the closed position.

2. A method according to claim 1 wherein the fluid pressure upstream of the valve member is sensed by a first pressure sensor and the fluid pressure downstream of the valve member is sensed by a second pressure sensor, and fluid flow downstream of valve member is sensed by a fluid flow sensor.

3. A method according to claim 1 wherein the alerting device is one of a visual display and an audible warning device.

4. A method according to claim 1 wherein the method includes configuring the controller to determine whether the fluid pressure upstream of the valve member is significantly higher than the fluid pressure downstream of the valve member, and if so, if sensed fluid flow is at least below a threshold value, to signal the alerting device to indicate that the valve member is in its closed position.

5. A method according to claim 1 wherein the valve is a butterfly valve, the valve member being rotatable in the fluid path and in its closed position, a periphery of the valve member and an internal surface of a fluid duct in which the fluid flow path is established, engaging to prevent fluid flow past the valve member.

6. A method according to claim 5 wherein the valve member is moveable between its fully open and closed positions by an actuating system under the control of a valve controller.

7. A method according to claim 6 wherein the valve controller is the same as the controller which processes the first, second and third signals, to provide the input to the alerting device.

8. A method according to claim 5 wherein the actuating system includes actuator which is connected to the valve member via a transmission.

9. A method according to claim 8 wherein the actuator is a linearly acting actuator and the valve member is of the rotatable kind, the linear action of the linear actuator being converted to a rotation of the valve member by the transmission.

10. A method according to claim 1 wherein the pressure and flow sensors are venturi or hot wire transducers which provide electrical signals to the controller.

11. A method according to claim 1 wherein the fluid flow is along a fluid flow path along which hot pressurised air bled from a gas turbine engine passes to a downstream auxiliary system.

12. A method according to claim 11 wherein the downstream auxiliary system is one of an air conditioning and anti-icing system of an aircraft, the alerting device for indicating the position of the valve member being located in or adjacent an aircraft cockpit, in each case to alert the aircraft pilot or other member of the air crew when the valve member is in at least one of an open and closed position.

13. An apparatus for providing an indication of the position of a valve member in a fluid path where the valve member is moveable between a fully open position in which a maximum flow of fluid past the valve member is permitted and a closed position in which fluid flow past the valve member is at least substantially prevented, the apparatus including a first sensor for sensing the fluid pressure in the fluid path upstream of the valve member to provide a first signal, a second sensor for sensing fluid pressure in the fluid path downstream of the valve member to provide a second signal and a third sensor for sensing fluid flow downstream of the valve member to provide a third signal, a controller for comparing the first and second signals and applying the third signal, the controller being configured so that, depending on the comparison of the first and second signals and the third signal, the controller signalling an alerting device which indicates whether the valve member is in at least one of an open and closed position.

14. An apparatus according to claim 13 wherein the pressure upstream of the valve member is sensed by a first pressure sensor and the fluid pressure downstream of the valve member is sensed by a second pressure sensor, and fluid flow downstream of valve member is sensed by a fluid flow sensor.

15. An apparatus according to claim 13 wherein the alerting device is one of a visual display and an audible warning device.

16. An apparatus according to claim 13 wherein the valve is a butterfly valve, the valve member being rotatable in the fluid path and in its closed position, a periphery of the valve member and an internal surface of a fluid duct in which the fluid flow path is established, engaging to prevent fluid flow past the valve member.

17. An apparatus according to claim 13 wherein the valve member is moveable between its fully open and closed positions by an actuating system under the control of a valve controller.

18. An apparatus according to claim 17 wherein the actuating system includes actuator which is connected to the valve member via a transmission.

19. An apparatus according to claim 18 wherein the actuator is a linearly acting actuator and the valve member is of the rotatable kind, the linear action of the linear actuator being converted to a rotation of the valve member by the transmission.

20. An apparatus according to claim 13 wherein the pressure and flow sensors are venturi or hot wire transducers which provide electrical signals to the controller.

21. An aircraft having a fluid flow path for pressurised air from an aircraft engine to a downstream auxiliary system, the aircraft including an apparatus for providing an indication of the position of a valve member in a fluid path where the valve member is moveable between a fully open position in which a maximum flow of fluid past the valve member is permitted and a closed position in which fluid flow past the valve member is at least substantially prevented, the apparatus including a first sensor for sensing the fluid pressure in the fluid path upstream of the valve member to provide a first signal, a second sensor for sensing fluid pressure in the fluid path downstream of the valve member to provide a second signal and a third sensor for sensing fluid flow downstream of the valve member to provide a third signal, a controller for comparing the first and second signals and applying the third signal, the controller being configured so that, depending on the comparison of the first and second signals and the third signal, the controller signalling an alerting device which indicates whether the valve member is in at least one of an open and closed position.

* * * * *